July 30, 1940.                P. SUBKOW                2,209,798
ELECTROSTATIC FRACTIONATOR
Filed Sept. 12, 1936            2 Sheets-Sheet 2

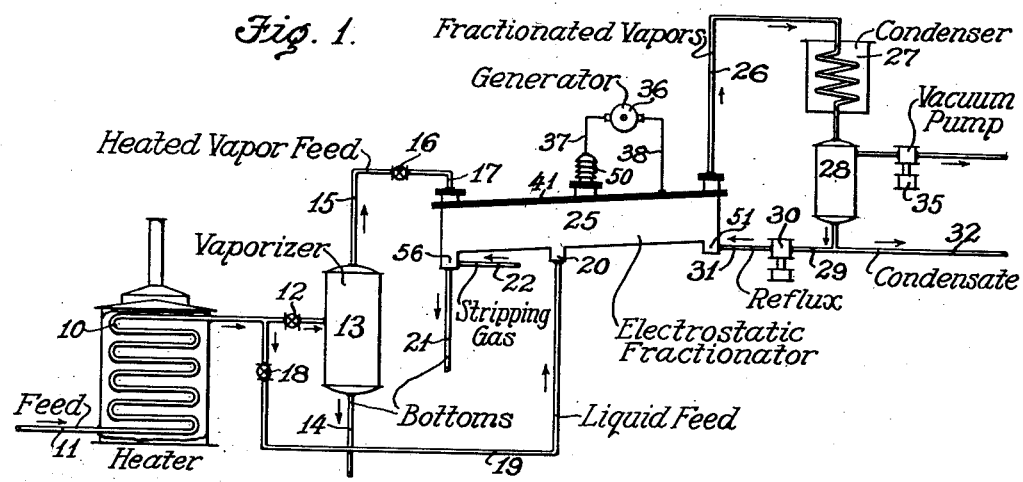
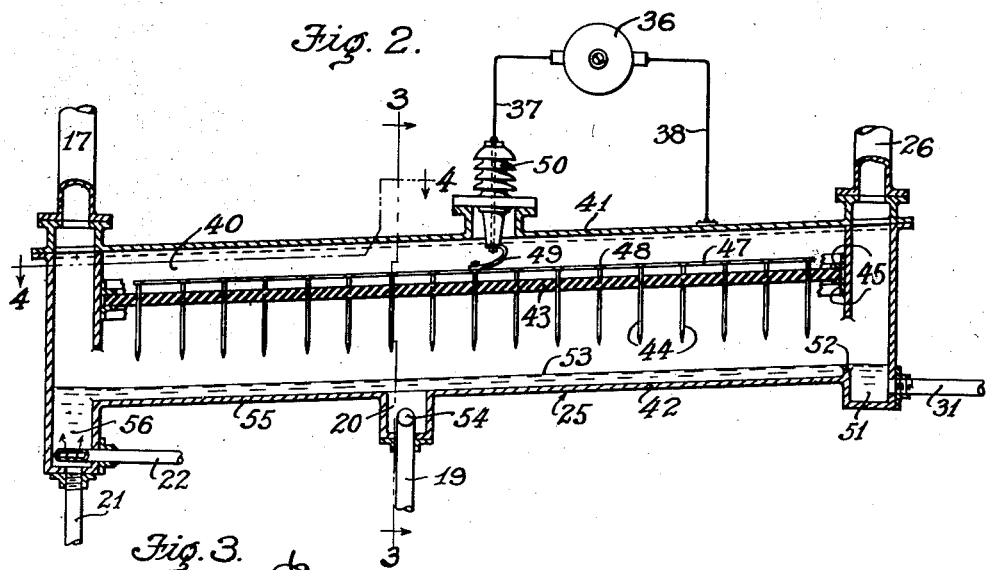
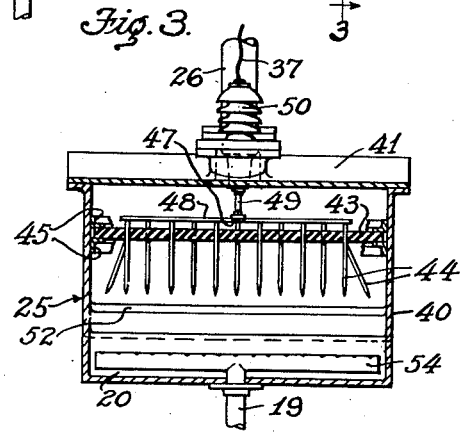

INVENTOR.
Philip Subkow
BY
Lyle Dillon
ATTORNEY.

Patented July 30, 1940

2,209,798

UNITED STATES PATENT OFFICE 2,209,798

ELECTROSTATIC FRACTIONATOR

Philip Subkow, West Los Angeles, Calif., assignor to Union Oil Company of California, Los Angeles, Calif., a corporation of California Application September 12, 1936, Serial No. 100,495

6 Claims. (Cl. 196—81)

This invention relates to fractional distillation and particularly to the electrostatic fractional distillation of hydrocarbon oils. The object of this invention is to accomplish precise fractional distillation with simple apparatus without the necessity of employing large columns containing a multiplicity of fractionating trays. It is also an object of this invention to accomplish fractional distillation with a minimum of back pressure upon the vapors through the apparatus.

It has been discovered that efficient fractional distillation can be accomplished by simple countercurrent contact with heated vapors and reflux provided entrainment can be held to a minimum while intimacy of contact of all the vapors with all of the reflux liquid is accomplished under the influence of an intense electrostatic field.

The invention accordingly, in its broadest aspect, resides in a method and apparatus for fractionating vapors wherein heated vapors and reflux liquid while passing in countercurrent contact are subjected to the influence of an intense electrostatic field. The invention resides more particularly in passing elongated countercurrently moving streams of vapors and reflux liquid in contact while subjecting them to an intense electrostatic field to produce overhead fractionated vapors free from heavier constituents and bottoms free from light constituents.

The invention also resides in vaporizing and condensing and/or fractionating any liquid or vapor in the presence of an electric field. The invention additionally resides in the separation of entrained liquids from vapors or gases.

Other objects and novel features of the invention will be evident hereinafter.

Figure 4:
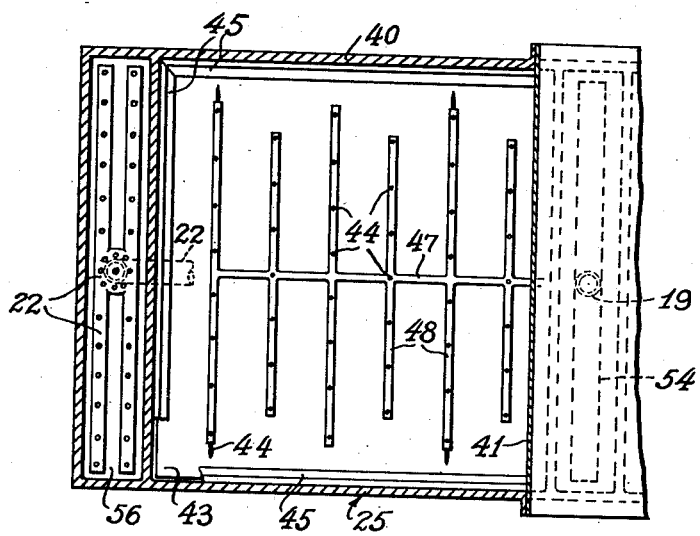
Figure 5:
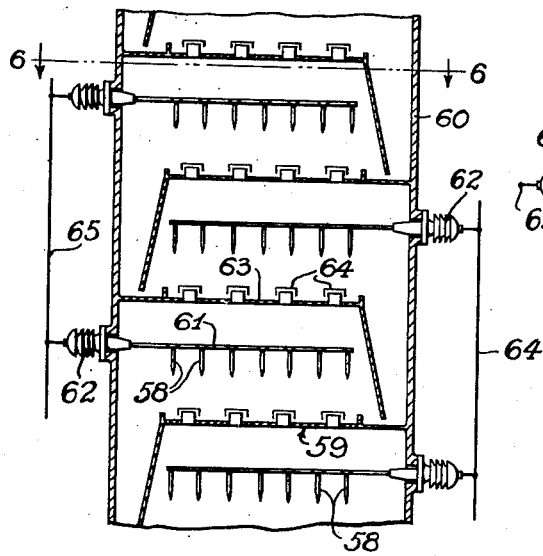
Figure 6:
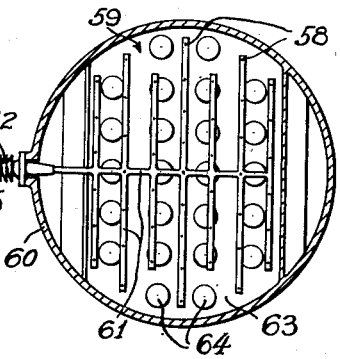

In the drawings, wherein embodiments of the invention are shown by way of illustration: Fig. 1 is a general arrangement of the electrostatic fractionator and its associated apparatus. Fig. 2 is a sectional elevation of the electrostatic fractionator. Fig. 3 is a cross section of the electrostatic fractionator taken on line 3—3 of Fig. 2. Fig. 4 is a partial sectional plan view taken on line 4—4 of Fig. 2 showing the arrangement of the electrodes. Fig. 5 is a sectional elevation of a fractionating column containing inter-tray electrodes. Fig. 6 is a cross section of the fractionating column taken on line 6—6.

The apparatus and method of operation, referring to Figs. 1-4 are as follows:

In a process for fractionating hydrocarbon oil according to this invention, the cold or partially preheated hydrocarbon feed enters the tubular heater 10 through the feed inlet 11. The heated hydrocarbon oil from the heater may next be introduced through valve 12 into the vaporizer 13 where separation of heated vapors and liquids is allowed to take place. The separated bottoms are withdrawn through bottoms outlet 14 and the vapors through the overhead line 15 and through valve 16 to the heated vapor inlet 17 to the electrostatic fractionator 25. When a liquid feed to the fractionator is employed the heated oil from the heater, instead of being introduced into the vaporizer is passed directly through valve 18 and line 19 into the feed inlet 20 of the electrostatic fractionator 25.

Unvaporized material from the electrostatic fractionator is withdrawn through the bottoms outlet 21. Heated stripping vapors, such as any suitable volatile hydrocarbon, may be introduced through the line 22 into the bottoms in the electrostatic fractionator. Overhead fractionated vapors from the fractionating column are withdrawn from the upper end of the fractionator 25 through line 26 and condensed at 27. The resultant condensate is accumulated in the drum 28 and from there a portion is returned to line 29 and pump 30 to the reflux inlet 31 at the upper end of the electrostatic fractionator. The balance of the condensate is withdrawn through line 32 to production.

Vacuum may be maintained in the fractionator 25 by means of the vacuum pump 35.

The high voltage supply to the electrostatic fractionator described hereinafter comprises the high voltage generator 36 and conductors 37 and 38, which make connection with the electrode system inside of the fractionator and with the fractionator shell, respectively.

Referring to Figs. 2 and 3, the electrostatic fractionator comprises a vapor-tight elongated chamber 40 having a top 41 and bottom surface 42 preferably sloping. Within the fractionator chamber 40 and extending the length and breadth thereof and dividing the fractionator into upper and lower chambers is an insulating partition 43 which serves as a support for the plurality of pointed rod shaped electrodes 44. The insulating partition 43 may consist of mica, porcelain, Pyrex or the like, suitably supported at the edges within the fractionator by the angles 45.

The pointed electrodes 44 extend through a plurality of staggered holes at approximately two inches on centers in the insulating partition 43, the arrangement of which is best shown in plan view in Fig. 4. The electrodes, which comprise sharp pointed metal rods approximately $\tfrac{1}{16}''$ in diameter, make substantially vapor-tight press fits in the holes in the supporting partition and they are electrically connected together at their upper ends by the interconnecting conductors 47 and 48. These conductors 47 and 48 are in turn connected at 49 through the lead-in insulator 50 and through the conductor 37 to the generator 36. The return connection from the generator to the fractionator shell is made through the conductor 38. The pointed ends of the electrodes 44 are positioned at such a distance above the sloping bottom surface 42 of the fractionator that under the high potentials employed a silent electrical discharge or corona is maintained therebetween. This silent electrical discharge is most intense when the electrode point is spaced just sufficiently far above the fractionator bottom surface to prevent persistent electrical disruption of the gases and liquids therebetween.

The heated vapors from the vaporizer 13 as described hereinbefore, enter the electrostatic fractionator through the inlet 17 and pass through and between the electrodes 44 and the fractionator bottom 42 in a slightly upward sloping stream and finally are exhausted through the fractionating vapor outlets 26 to be finally condensed in the condenser 27. The reflux liquid from the condenser is introduced into the upper end of the fractionator through the pipe 31 and after accumulation in the reflux distributor trough 51 overflows at the weir 52 and passes down the inclined bottom 42 of the fractionator in the form of a wide relatively shallow stream as shown at 53. The reflux condensate after thus passing down the fractionator bottom 42, falls into the bottoms accumulator 56 and thence through the bottoms outlet 21.

The heated gases passing through the fractionator from the inlet 17 to the outlet 26 are thus forced to pass in countercurrent contact with the cooled reflux condensate which flows downward over the bottom of the fractionator from the reflux inlet 31 to the bottoms outlet 21.

Simple countercurrent contact of reflux and vapors is known to accomplish inefficient fractionation for the reason that under these conditions poor contact of the liquids and vapors results, and by passing of portions of the liquids and vapors without mutual contact, entrainment and other effects detrimental to efficient fractionation are free to occur.

In the present invention, however, these detrimental effects are largely eliminated by subjecting the countercurrently moving liquid and vapor streams to the effect of intense electrostatic fields and these electrostatic fields are applied in the present apparatus through the countercurrently moving gases and liquids by means of the pointed electrodes 44.

The application of the electrostatic field in this manner effects an improvement in fractional distillation under these conditions of simple countercurrent contact, by inducing intense electrical windages from the points of the electrodes towards the upper surface of the downward flowing reflux stream. This electrical windage insures contact of all of the heated vapors with the liquid reflux bony. The electrical windage also has the effect of causing a rapid and frequent repetition of this complete contact of the gases with the reflux condensate throughout the length of the countercurrent flow. This then produces the effect of a multiplicity of fractionating zones with a minimum of remixture and entrainment.

Entrained liquid particles which are swept off of the reflux condensate surface by the countercurrently moving gases are instantly electrically charged in the ionizing corona discharge from the pointed electrodes and immediately returned to the reflux condensate stream under the influence of the resulting electrodynamic forces.

Thus, high velocities and resultant high capacities in rate of distillation can be maintained without the detrimental effect of entrainment usually associated therewith. The effect of the electric field betweeen the pointed electrodes and the bottom surface of the fractionator is thus equivalent to that of increasing the gravitational force several times, whereby the entrained liquid force droplets are prevented largely from leaving the reflux condensate liquid surface or when they do leave are almost instantly returned. Separation of entrained liquid from the vapors undergoing fractionation is thus accomplished by an electrical force which is similar in effect to the application of centrifugal force, which tends to throw the entrained particles back into the liquid body.

A liquid feed to the fractionator may be employed exclusively or together with the vapor feed as desired. When a heated hydrocarbon liquid feed is employed it is introduced as described hereinbefore through the line 19 and the inlet 20 to the feed distributor manifold 53. From the feed distributor manifold 53 the heated feed material flows in a relatively thin stream down the lower section of the inclined fractionator bottom 54 to the bottoms accumulating recess 52 where, if desired, it may be contacted with a heated stripping vapor such as introduced through the line 22. The resulting vapors from the feed pass, as before, upwardly through the fractionator in countercurrent with reflux condensate entering through line 31 and resulting fractionated vapors are finally exhausted through line 26 and condensed in condenser 27. The lower section of the fractionator on the one side of the feed inlet thus constitutes in effect a stripping section and the upper section on the other side of the feed inlet the fractionating section.

Electrical potentials which have been found satisfactory in the present application are those which produce copious corona discharges from the electrode points toward the reflux condensate stream. The most effective voltages have been found to range from 30,000 to 100,000 volts. The electrodes, when these voltages are applied, are adjusted so that the spacing between the points and the bottom surface 42 of the fractionator is such that when the reflux condensate and vapors are in countercurrent flow a condition of incipient disruption of the gaseous and liquid dielectric is in effect. Under these conditions, an intense corona is seen to appear in the intervening space.

The electrodes are arranged preferably in rows as shown in Fig. 4 extending at right angles to the direction of flow of the fluids as shown in Fig. 4. With this arrangement the countercurrently moving liquid and vapors is subjected in effect to a plurality of ionizing fields which appear to have the effects of a plurality of fractionating zones as between plates in a fractionating column. Thus, for each longitudinal interval between electrode rows a complete cycle of operations comparable to that occurring in each fractionating zone in a fractionating column occurs which comprise complete turbulence and contact of the vapors with the liquid stream, complete turbulence and contact of the liquid stream with the vapors and ionization of entrained liquids with their separation and complete return to the liquid stream. This cycle is repeated for every interval between the electrode rows.

Extraordinarily good contact between the vapors and liquid is caused by the high velocity impingement of the ionized portions of the gaseous stream upon the liquid reflux condensate stream surface. This bombardment of ionized gas upon the liquid surface also results in exceedingly high turbulence and mixture within the liquid stream itself. The overall result of the ionization is the substantially complete contact of all of the gaseous phase with all of the liquid phase at rapid and numerous intervals throughout the length of the fractionating and rectifying zones.

While rod type electrodes have been shown by way of illustration, other types of electrodes may obviously be employed, it being essential only that their active ends terminate in areas which are relatively small with respect to the area of the electrode of opposite polarity. The electrode of opposite polarity in the present case constitutes the sloping bottom of the fractionator 42. The electrodes, therefore, instead of being rod shaped as illustrated, may, for example, be constructed of thin flat sheet metal with points directed downwardly toward the fractionator bottom.

Advantages of the present method and operation of fractionating oil lies in its adaptability to high vacuum distillation where the pressure differential through the fractionating apparatus may be a substantial proportion of the total operating pressure and therefore a limiting condition upon the minimum pressure that can be maintained in the system. The method and apparatus of this invention thus permits high vacuum distillation by reason of the negligible pressure gradient through its fractionating apparatus.

Referring to Figs. 5 and 6, an arrangement of a plurality of pointed electrodes 58, similar to those already described in connection with Figs. 1 to 4, are employed in the gas space between fractionating trays 59 in a fractionating column 60. The pointed electrodes are supported by a metal grid-work 61 in groups conforming approximately to the circular sections of the fractionating column. The grids 61 are in turn supported between the trays and electrically connected to an outside source of high potential through the lead-in insulator bushings 62. Electrical connection is made through the conductors 64 and 65 to one side of the high voltage source, with the column shell constituting the return circuit from the other side of the high voltage source in a manner similar to that illustrated in Fig. 2. The top surfaces of the trays 63 and bubble cap 64 thus constitutes the electrodes of opposite polarity adjacent the ends of the pointed electrodes.

As before described, the potential difference and the spacing maintained between the pointed electrodes and the adjacent tray surface is such that intense ionizing fields are present there.

In operation the tense ionization between the pointed electrodes and the fractionating trays acts to free the upward passing vapors from entrained liquid and to return the separated entrainment to the liquid bodies on the trays. Moreover, the presence of the electric field at the liquid-vapor interface substantially prevents the initial entrainment of liquid in the passing vapors. The intense electric field passing through the surface of the oil layer flowing across the tray also effects its vapor pressure in a manner favorable to increased vaporization at a given temperature. These effects of the electric field result in increased capacity for a given fractionating column size, and also in increased preciseness of fractionation for a given number of trays.

This invention is not limited in its application to hydrocarbon oils and vapors but is applicable to any liquid, the vapors of which are substantially electrically non-conducting.

The foregoing is merely illustrative of the method and apparatus of the invention and is not intended to be limiting. The invention includes any method and apparatus which accomplishes the same results within the scope of the claims.

I claim:

1. Apparatus for fractionating oil comprising in combination a fractionating column, a plurality of fractionating trays in said fractionating column, means to pass heated vapors upwardly through said fractionating trays in countercurrent contact with descending reflux condensate, electrodes in said fractionating column intermediate said fractionating trays and out of contact with the liquid on said trays and means to maintain an intense ionizing electric field from said electrodes in the fractionating column to said fractionating trays.

2. A process for fractionating oil comprising heating the oil to a vaporizing temperature, flowing a body of said heated oil in countercurrent contact with a body of vapors derived from said oil, establishing a high potential electric field between the surface of said body of oil and a plurality of electrodes spaced from said oil body and located in said body of vapors to effect fractionation of the vapors, and separately withdrawing a fractionated vapor and a residual oil.

3. A process according to claim 2 in which the high potential electric field is intermittently varied along the line of said flow of said heated oil.

4. A process for fractionating oil comprising flowing a body of heated oil in countercurrent contact with a body of vapors formed from said oil, establishing a high potential electric field between the surface of said body of oil and an electrode spaced from and out of contact with said oil body and located in said body of vapor to effect fractionation of the vapors, said high potential electric field being intermittently varied along the line of flow of said heated oil, and separately withdrawing a fractionated vapor and a residual oil.

5. A process for fractionating oil comprising passing a continuous body of heated oil in countercurrent contact with a continuous body of oil vapors and subjecting said bodies at the point of mutual contact to an electric field which is of variable intensity along the path of flow of said bodies whereby a plurality of contacts of oil and vapor are effected and withdrawing a liquid fraction from said body of heated oil and fractionated vapors from said body of vapors.

6. A process for fractionating oil comprising passing a layer of oil at a vaporizing temperature over a fractionating tray, passing heated vapors through said layer of oil on said tray, maintaining a high potential electric field between the surface of said layer of oil and an electrode spaced from and out of contact with said oil layer and separated therefrom by vapors said electric field being in the form of an electrical windage impinging upon said oil layer and separately withdrawing vapor and oil from said fractionating tray.

PHILIP SUBKOW.

CERTIFICATE OF CORRECTION.

Patent No. 2,209,798. July 30, 1940.

PHILIP SUBKOW.

It is hereby certified that error appears in the printed specification of the above numbered patent requiring correction as follows: Page 3, second column, lines 38 and 39, claim 3, strike out the words "high potential electric field is intermittently varied along the line of said flow of said heated oil" and insert instead --electric field is in the form of an electrical windage from said electrodes and impinging on the surface of said oil body--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.